(No Model.)
M. R. EWING.
HAMMOCK.
No. 312,988. Patented Feb. 24, 1885.
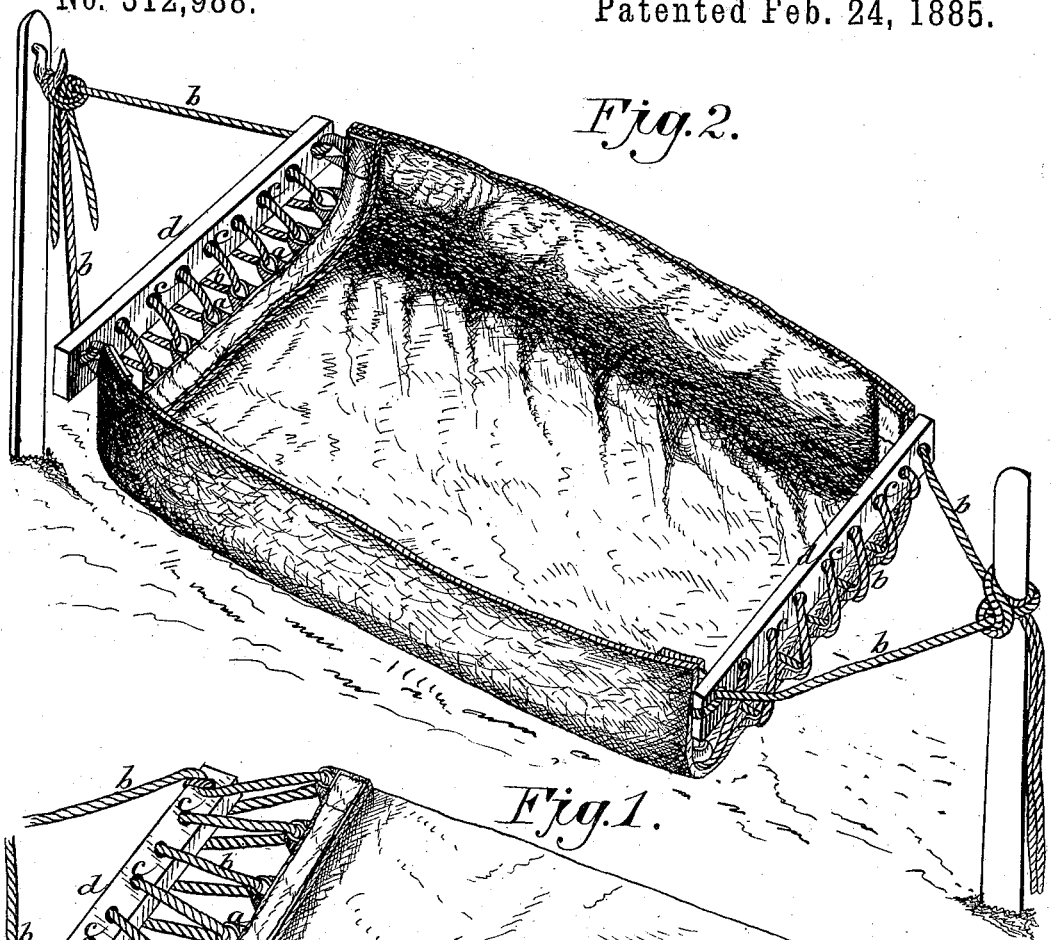
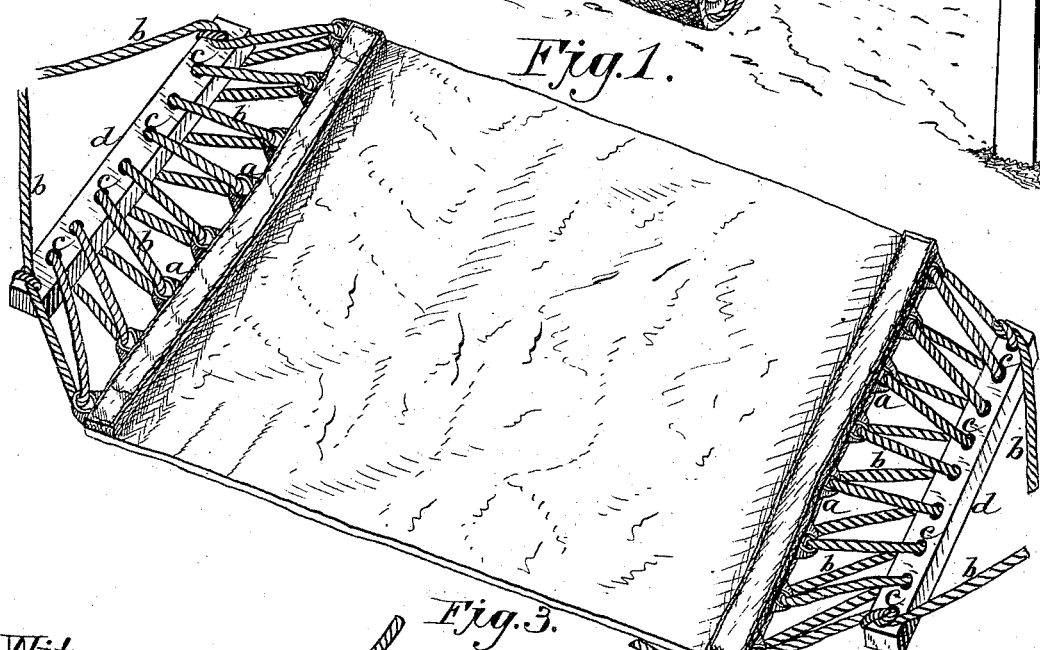

UNITED STATES PATENT OFFICE.

MARY R. EWING, OF PATASKALA, ASSIGNOR OF ONE-HALF TO SARAH J. McCORD, OF PORTSMOUTH, OHIO.

HAMMOCK.

SPECIFICATION forming part of Letters Patent No. 312,988, dated February 24, 1885.

Application filed April 4, 1884. (No model.)

*To all whom it may concern:*

Be it known that I, MARY R. EWING, a citizen of the United States, residing at Pataskala, in the county of Licking and State of Ohio, have invented new and useful Improvements in Hammocks, of which the following is a specification.

My invention relates to hammocks; and my improvement consists in a novel means whereby the hammock can be spread and maintained in substantially a flat position, as a couch, for comfortably holding persons to the extent of its capacity, or made narrow, as may be required. I use a single suspending-cord for each end of the hammock, in combination with end suspension-bars, through holes in which each cord is first passed, and then through loops or holes in the hammock, each suspension-bar having a length which is less than the width of the hammock.

Referring to the accompanying drawings, Figure 1 represents in perspective my improved hammock adjusted as a flat couch; and Fig. 2, a similar view, the hammock being adjusted in a narrower position, and Fig. 3 a top view of one end of the hammock.

The hammock may be made in any suitable manner for strength and durability. I prefer to make it with the end loops, *a;* but eyes may be formed in the end borders for the suspension-cord. A single suspension-cord, *b,* is first passed through the end hole of a series of holes, *c,* in a suspension-bar, *d,* and then through the end loop of a series of hammock-loops, and regularly through the bar-holes and loops, and finally through the last hole in the bar. I use such a single cord and suspension-bar for each end of the hammock, by which it is suspended and adjusted. The suspension-bars are shorter than the width of the hammock, and when the latter is adjusted for a flat couch, as in Fig. 1, the cords are tied at each end of each suspension-bar and the hammock thus suspended by the combined functions of the bars and the cords. By reason of having the short suspension-bars and the single cords the lacing of the latter will stand in oblique positions toward the ends of the hammock, so that in the adjustment of the suspension-bars away from the ends of the hammock the latter will form a substantially flat couch, as shown in Fig. 1. By adjusting the suspension-bars upon the cords so that the bars will be drawn nearer the ends of the hammock, or the ends of the bars against the corners of the hammock, the latter will assume a narrow position by reason of the shortness of the bars, as shown in Figs. 2 and 3. The capacity for these adjustments gives greater convenience to the hammock in adapting it as a bed in the summer and as a comfortable cot in the winter.

The different positions of the hammock shown in the drawings are produced by the short suspension-bars and the single cords, and the hammock is maintained in the positions shown in Fig. 1 by tying each cord around or at each end of the suspension-bars.

The position of the hammock shown in Fig. 2 is produced by untying the cords from the ends of the suspension-bars and drawing the corners of the hammock close to the ends of the suspension-bars, in which adjustment the suspension-bars will form head and foot boards to the hammock, and the cords will form a lacing in the space between the lower edges of the suspension-bars and the connected ends of the hammock, making, in fact, a bed with raised sides and ends, the suspension-bars requiring no tying in this position. In any position the hammock is suspended directly by the bars, and the latter are suspended directly by the single cords, and it is by these means that the hammock is adapted for the adjustments shown.

It will be understood that by drawing the lacing through all the holes in the suspension-bars and through the hammock-loops the bars can be adjusted nearer to or farther from the ends of the hammock, and thus adjust it, as described.

In Fig. 3 the cross-bar is shown as set against the loops throughout its length, so that the sides of the hammock will not be so much raised as in Fig. 2.

I claim—

1. The combination, with the main body of the hammock, of the perforated suspension-bars, and the single suspension-cords interlaced with the main body of the hammock-loops and with the suspension-bars, substantially as herein described, for the purpose specified.

2. The combination, with the main body of the hammock, of the adjustable suspension-bars $d\ d$, each provided with holes $c$ along its length, the distance between the end holes in each bar being less than the width of the hammock, and the single suspension-cords interlaced with the main body of the hammock-loops and with the suspension-bars, substantially as described, whereby the bars may be adjusted to spread and maintain the hammock in flat position, as a couch, or made narrower with raised sides, as herein set forth.

In testimony whereof I have hereunto set my hand in the presence of two subscribing witnesses.

MARY R. EWING.

Witnesses:
 ELIZA CLARKE,
 EDW. D. CLARKE.